(12) United States Patent
Comb

(10) Patent No.: US 9,744,730 B2
(45) Date of Patent: Aug. 29, 2017

(54) MAGNETIC PLATEN ASSEMBLY FOR ADDITIVE MANUFACTURING SYSTEM

(71) Applicant: Stratasys, Inc., Eden Prairie, MN (US)

(72) Inventor: James W. Comb, Hamel, MN (US)

(73) Assignee: Stratasys, Inc., Eden Prairie, MN (US)

( * ) Notice: Subject to any disclaimer, the term of this patent is extended or adjusted under 35 U.S.C. 154(b) by 774 days.

(21) Appl. No.: 14/087,590

(22) Filed: Nov. 22, 2013

(65) Prior Publication Data

US 2015/0145174 A1    May 28, 2015

(51) Int. Cl.
  *B29C 35/08* (2006.01)
  *B29C 67/00* (2017.01)
  *G03G 15/22* (2006.01)

(52) U.S. Cl.
  CPC ...... *B29C 67/0092* (2013.01); *B29C 67/0085* (2013.01); *G03G 15/224* (2013.01); *B29C 67/0055* (2013.01); *B29C 67/0081* (2013.01); *G03G 15/225* (2013.01)

(58) Field of Classification Search
  CPC ............ B29C 67/0092; B29C 67/0085; B29C 67/0081; B29C 67/0055
  See application file for complete search history.

(56) References Cited

U.S. PATENT DOCUMENTS

| | | |
|---|---|---|
| 5,121,329 A | 6/1992 | Crump |
| 5,169,081 A | 12/1992 | Goedderz |
| 5,253,012 A * | 10/1993 | Chiba .................. G03F 7/70741 355/53 |
| 5,303,141 A | 4/1994 | Batchelder et al. |
| 5,312,224 A | 5/1994 | Batchelder et al. |
| 5,340,433 A | 8/1994 | Crump |
| 5,503,785 A | 4/1996 | Crump et al. |
| 5,738,817 A | 4/1998 | Danforth et al. |
| 5,764,521 A * | 6/1998 | Batchelder .............. B29C 41/36 156/244.21 |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |

(Continued)

*Primary Examiner* — Galen Hauth
(74) *Attorney, Agent, or Firm* — Peter J. Ims; Westman, Champlin & Koehler, P.A.

(57) ABSTRACT

A platen assembly for use in an additive manufacturing system, which includes a platen plate that is preferably secured to a gantry mechanism of the additive manufacturing system, and having a top surface, and one or more magnets secured to the platen plate and configured to generate one or more magnetic fields at the top surface of the platen plate. The platen gantry is configured to magnetically couple interchangeable and replaceable build sheets to the top surface of the platen plate due to the one or more generated magnetic fields, and where the magnetically-coupled build sheets are configured to receive the printed layers from the printing mechanism.

14 Claims, 7 Drawing Sheets

(56) References Cited

U.S. PATENT DOCUMENTS

| | | |
|---|---|---|
| 6,206,672 B1 * | 3/2001 | Grenda .............. B29C 67/0074 264/484 |
| 6,228,923 B1 | 5/2001 | Lombardi et al. |
| 6,257,517 B1 | 7/2001 | Babish et al. |
| 6,367,791 B1 * | 4/2002 | Calderon ........... B29C 47/0014 269/291 |
| 6,547,995 B1 | 4/2003 | Comb |
| 6,645,412 B2 | 11/2003 | Priedeman, Jr. |
| 6,685,866 B2 | 2/2004 | Swanson et al. |
| 6,722,872 B1 * | 4/2004 | Swanson ................ B29C 41/36 425/225 |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 6,976,627 B1 | 12/2005 | Culp et al. |
| 6,998,087 B1 | 2/2006 | Hanson et al. |
| 7,122,246 B2 | 10/2006 | Comb et al. |
| 7,127,309 B2 | 10/2006 | Dunn et al. |
| 7,172,715 B2 | 2/2007 | Swanson et al. |
| 7,236,166 B2 | 6/2007 | Zinniel et al. |
| 7,261,533 B2 | 8/2007 | Wrosz et al. |
| 7,306,152 B2 | 12/2007 | Culp et al. |
| 7,384,255 B2 | 6/2008 | LaBossiere et al. |
| 7,481,647 B2 | 1/2009 | Sambu et al. |
| 7,572,121 B2 | 8/2009 | Wrosz et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 7,917,243 B2 | 3/2011 | Kozlak et al. |
| 7,938,351 B2 | 5/2011 | Taatjes et al. |
| 7,938,356 B2 | 5/2011 | Taatjes et al. |
| 8,033,811 B2 | 10/2011 | Swanson et al. |
| 8,070,473 B2 | 12/2011 | Kozlak |
| 8,075,300 B2 | 12/2011 | Zinniel |
| 8,153,182 B2 | 4/2012 | Comb et al. |
| 8,153,183 B2 | 4/2012 | Skubic et al. |
| 8,221,669 B2 | 7/2012 | Batchelder et al. |
| 8,226,395 B2 | 7/2012 | Pax et al. |
| 8,282,380 B2 | 10/2012 | Pax et al. |
| 8,287,794 B2 | 10/2012 | Pax et al. |
| 8,323,017 B2 | 12/2012 | Kritchman et al. |
| 8,419,996 B2 | 4/2013 | Swanson et al. |
| 8,488,094 B2 | 7/2013 | Mochiku |
| 2005/0129941 A1 | 6/2005 | Comb et al. |
| 2005/0173855 A1 * | 8/2005 | Dunn .................. B29C 67/0092 269/291 |
| 2007/0003656 A1 | 1/2007 | LaBossiere et al. |
| 2007/0228590 A1 | 10/2007 | LaBossiere et al. |
| 2009/0035405 A1 | 2/2009 | Leavitt |
| 2009/0074966 A1 * | 3/2009 | Henderson ............ B82Y 10/00 427/256 |
| 2009/0173443 A1 | 7/2009 | Kozlak et al. |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2010/0327479 A1 | 12/2010 | Zinniel et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0186081 A1 | 8/2011 | Dunn et al. |
| 2011/0233804 A1 | 9/2011 | Batchelder et al. |
| 2011/0241947 A1 | 10/2011 | Scott et al. |
| 2012/0046779 A1 * | 2/2012 | Pax .................... B29C 67/0055 700/112 |
| 2012/0067501 A1 | 3/2012 | Lyons |
| 2012/0068378 A1 | 3/2012 | Swanson et al. |
| 2012/0070523 A1 | 3/2012 | Swanson et al. |
| 2012/0162314 A1 | 6/2012 | Swanson et al. |
| 2012/0164256 A1 | 6/2012 | Swanson et al. |
| 2013/0075957 A1 | 3/2013 | Swanson et al. |
| 2013/0077996 A1 | 3/2013 | Hanson et al. |
| 2013/0078073 A1 | 3/2013 | Comb et al. |
| 2013/0186549 A1 | 7/2013 | Comb et al. |
| 2013/0186558 A1 | 7/2013 | Comb et al. |

* cited by examiner

MAGNETIC PLATEN ASSEMBLY FOR ADDITIVE MANUFACTURING SYSTEM

BACKGROUND

The present disclosure relates to additive manufacturing systems for printing three-dimensional (3D) parts and support structures. In particular, the present disclosure relates to build sheets for receiving printed 3D parts and support structures in additive manufacturing systems.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to an additive manufacturing system for printing a 3D part. The additive manufacturing system includes a printing mechanism (e.g., an electrophotography engine, a print head, etc. . . . ) configured to print layers of the 3D part and a platen assembly. The platen assembly includes a platen plate, which preferably mounted to a gantry mechanism of the additive manufacturing system, and having a top surface, and one or more magnets secured to the platen plate and configured to generate one or more magnetic fields at the top surface of the platen plate. The platen assembly is configured to magnetically couple a build sheet to the top surface of the platen plate due to the one or more generated magnetic fields, where the magnetically-coupled build sheet is configured to receive the printed layers from the printing mechanism.

Another aspect of the present disclosure is directed to a platen assembly for use in an additive manufacturing system, which includes a chuck portion and a plurality of build sheets. The chuck portion includes a platen plate that has a top surface, a plurality of first openings disposed below the top surface, and at least one second opening disposed below the top surface. The chuck portion also includes a plurality of magnets secured in the plurality of first openings in the platen plate, where the plurality of secured magnets are configured to generate magnetic fields at the top surface of the platen plate. The chuck portion also includes at least one heating element disposed in the at least one second opening in the platen plate. The build sheets are each configured to interchangeably couple to the top surface of the platen plate due to the generated magnetic fields, and each have a receiving surface to receive printed layers of a 3D part and/or support structure.

Another aspect of the present disclosure is directed to a method for using a platen assembly in an additive manufacturing system. The method includes placing a first build sheet onto a top surface of a platen plate that is operably mounted to a gantry mechanism of the additive manufacturing system, magnetically coupling the placed first build sheet to the top surface of the platen plate, and printing layers of a 3D part onto the magnetically-coupled first build sheet. The method also includes removing the first build sheet with the printed 3D part from the top surface of the platen plate, and flexing the first build sheet to delaminate the 3D part from the first build sheet. The method may also include placing a second build sheet onto the top surface of the platen plate, magnetically coupling the placed second build sheet to the top surface of the platen plate, and printing layers of a second 3D part onto the magnetically-coupled second build sheet.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis.

However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
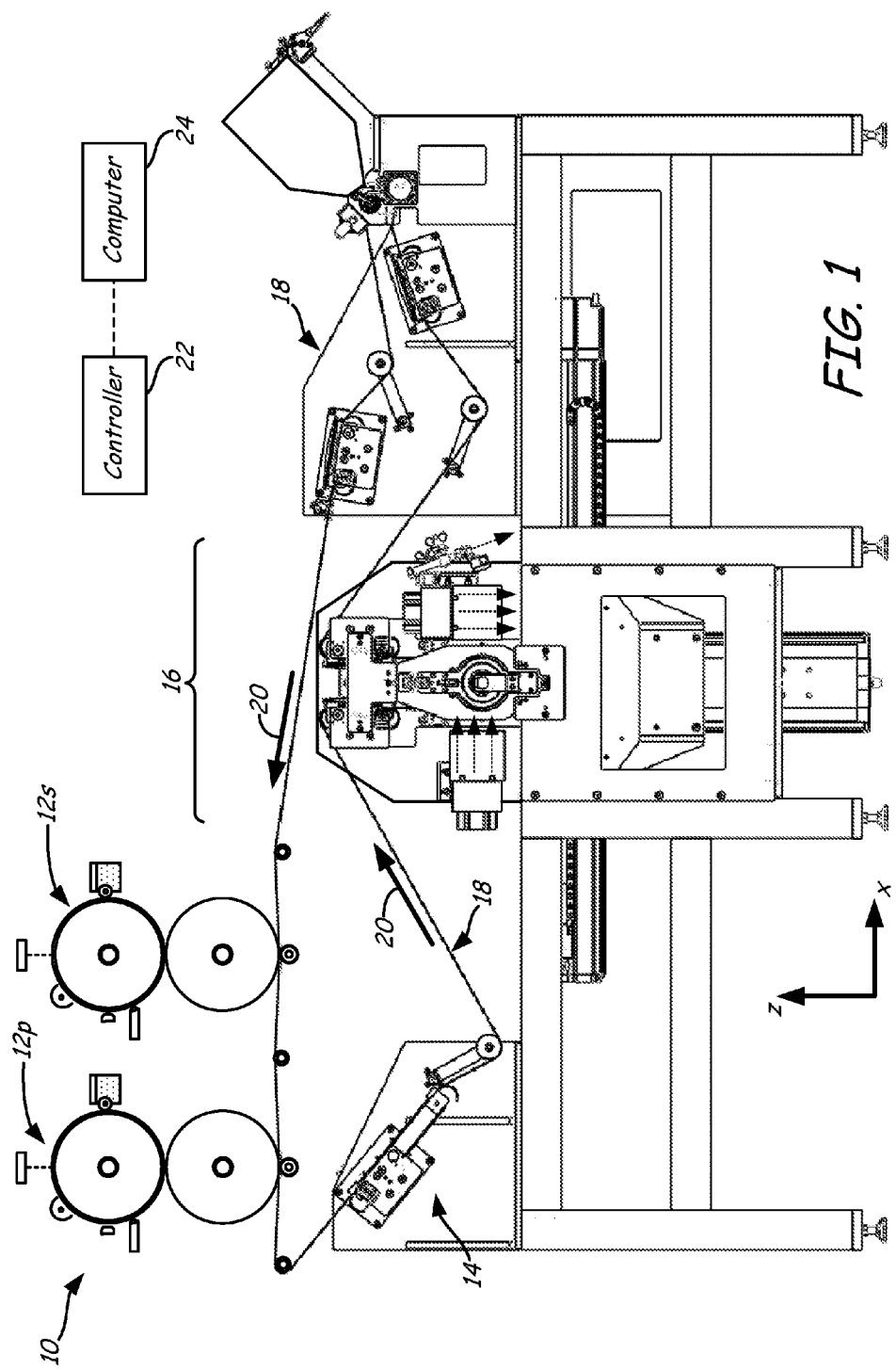
FIG. 1 is a front view of an example electrophotography-based additive manufacturing system for printing 3D parts and support structures with a platen assembly of the present disclosure.

The present disclosure is directed to a platen assembly for use in additive manufacturing systems, such as electrophotography-based additive manufacturing systems, extrusion-based additive manufacturing systems, and jetting-based additive manufacturing systems, to print 3D parts and support structures. In particular, the platen assembly of the present disclosure includes a chuck portion configured to magnetically retain removable and interchangeable build sheets during printing operations.

Additive manufacturing systems typically print 3D parts and support structures in a layer-by-layer manner onto build substrates, which function as receiving surfaces for the printed layers. This typically involves printing a base layer of the part and/or support material onto the build substrate, and then printing the desired 3D part and support structure on top of the base layers. An example of this application is discussed in LaBossiere et al., U.S. patent application Ser. No. 13/909,294, entitled "Platen Planarizing Process For Additive Manufacturing System".

A build substrate is typically a plastic component, such as an injection-molded tray or a thin plastic film, with surface energies and/or surface roughness tailored to achieve good adhesion with the first printed layer. Good adhesion is beneficial for anchoring the printed layers, thereby reducing curl and part distortions during the printing process.

However, this good adhesion can also present an issue with removal of the printed 3D part and support structure from the build substrate, particularly where the first printed layer is derived from a part material or other non-soluble material. As such, the build substrate is preferably flexible enough to allow a user to peel the build substrate from the base of the printed 3D part/support structure.

In particular, the flexing of the build substrate amplifies the stresses induced at the bending line of action, causing delamination of the 3D part from its base layers, or delamination of the base layers from the build substrate. Earlier systems incorporated thick inflexible build platens, making removal of thick stiff 3D parts with large base areas very difficult. In fact, the only effective solution of removal in this case involved prying the 3D part off with crow bar-like device or chisel, which could damage the 3D part or platen. Otherwise, the 3D part and platen would be removed from the system, and a band saw would be used to cut the thick 3D part from the inflexible base.

Flexible plastic trays, such as those disclosed in Dunn et al., U.S. Pat. No. 7,127,309, can be reliably mounted in additive manufacturing systems with snap features that hold the trays in a reasonably flat condition. These trays are produced by injection molding and can be treated as a disposable item, although at times they may be reused if the first printed layers can be cleanly removed from the surfaces. These trays are vertically stiff only at the snap feature locations, and are springy in the vertical direction in between these mounting points.

Alternatively, in other systems, such as those disclosed in Skubic et al., U.S. Pat. No. 8,153,183, thin plastic films can be used, which are typically held by vacuum onto flat stiff metal platens. This maintains the thin film in a flat condition during the printing operation. However, in some applications, the cost and complexity of adding a vacuum system can be a detracting feature, and can potentially be sensitive to debris contamination between the film and the platen. This can cause weak or total loss of suction, allowing the film to undesirably move during the printing process. Additionally, vacuum systems can be noisy, which can be undesirable in some applications.

In comparison, the platen assembly of the present disclosure, which incorporates a chuck portion that magnetically couples to removable and interchangeable build sheets, provides several unique advantages over build substrates currently used in the industry. As discussed below, the magnetic coupling allows low-cost and reliable build sheets to be used without also requiring vacuum systems, which can substantially reduce the complexity of the additive manufacturing system.

The following discussion of the platen assembly of the present disclosure is made with reference to use in an electrophotography-based additive manufacturing system, which is a preferred system. However, the magnetic platen assembly may also be utilized with any suitable additive manufacturing system that includes one or more printing mechanisms for printing layers of 3D parts and/or support structures, where good substrate adhesion is desired.

For instance, the platen assembly is also advantageous for use in extrusion-based additive manufacturing systems, such as those developed by Stratasys, Inc., Eden Prairie, Minn. under the trademark "FDM". In these embodiments, examples of suitable extrusion-based additive manufacturing systems include those disclosed in Crump, U.S. Pat. No. 5,121,329; Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625, 200; Batchelder et al., U.S. Pat. No. 7,896,209; Comb et al., U.S. Pat. No. 8,153,182; and Swanson et al., U.S. Pat. No. 8,419,996.

Alternatively, the platen assembly may also be useful in jetting-based additive manufacturing systems, such as those described in Kritchman et al., U.S. Pat. No. 8,323,017. As used herein, the term "printing mechanism" refers to the component(s) used to print layers of the 3D parts and/or support structures onto the platen assembly. For example, the printing mechanism may include one or more electrophotography engines and/or a transfer medium (for electrophotography-based additive manufacturing systems), one or more print heads (for extrusion-based and jetting-based additive manufacturing systems, powder dispensing mechanisms and/or laser or jetting heads (for selective laser sintering and binder-jetting additive manufacturing systems), and the like.

Figure 2:
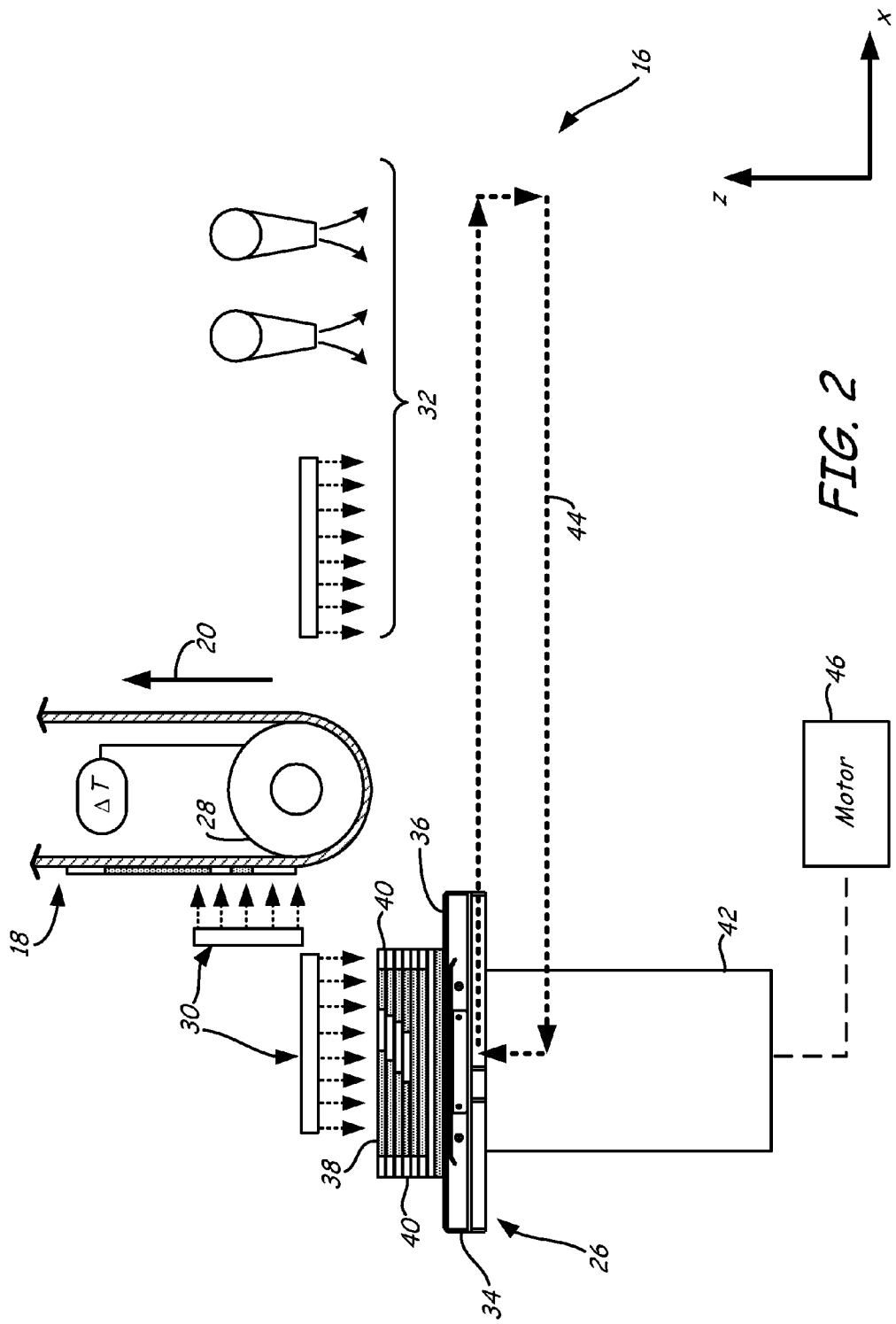
FIG. 2 is a schematic front view of a layer transfusion assembly of the system, which includes the platen assembly of the present disclosure.

FIGS. 1 and 2 illustrate system 10, which is an example electrophotography-based additive manufacturing system for printing 3D parts and associated support structures with the use of the platen assembly of the present disclosure. As shown in FIG. 1, system 10 includes a pair of EP engines 12$p$ and 12$s$, belt transfer assembly 14, and layer transfusion assembly 16. Examples of suitable components and functional operations for system 10 include those disclosed in Hanson et al., U.S. Publication Nos. 2013/0077996 and 2013/0077997, and in Comb et al., U.S. Publication Application Nos. 2013/0186549 and 2013/0186558, where layer transfusion assembly 16 is uniquely designed to incorporate the platen assembly of the present disclosure.

EP engines 12$p$ and 12$s$ are imaging engines for respectively imaging or otherwise developing layers of part and support materials, where the part and support materials are each preferably engineered for use with the particular architecture of EP engine 12$p$ or 12$s$. The imaged layers may then be transferred to belt transfer assembly 14 (or other transfer medium), and carried to layer transfusion assembly 16 to print the 3D parts and associated support structures in a layer-by-layer manner.

In the shown embodiment, belt transfer assembly 14 includes transfer belt 18 and one or more belt drive mechanisms, belt drag mechanisms, loop limit sensors, idler rollers, belt cleaners, and the like, which are configured to maintain tension on belt 18 while belt 18 rotates in the rotational direction of arrows 20. Belt 18 is a transfer medium for transferring the developed successive layers from EP engines 12$p$ and 12$s$ to layer transfusion assembly 16.

System 10 also includes controller 22, which is one or more control circuits, microprocessor-based engine control systems, and/or digitally-controlled raster imaging processor systems, and which is configured to operate the components of system 10 in a synchronized manner based on printing instructions received from host computer 24. Host computer 24 is one or more computer-based systems configured to communicate with controller 22 to provide the print instructions (and other operating information). For example, host computer 24 may transfer information to controller 22 that relates to the sliced layers of the 3D parts and support structures, thereby allowing system 10 to print the 3D parts and support structures in a layer-by-layer manner.

Controller 22 preferably rotates EP engines 12$p$ and 12$s$ at the same rotational rates that are synchronized with the line speed of belt 18. This allows system 10 to develop and transfer layers in coordination with each other from separate developer images. In particular, each part layer may be transferred to belt 18 with proper registration with each support layer to preferably produce a combined part and support material layer. As can be appreciated, some layers transferred to layer transfusion assembly 16 may only include the support material or may only include the part material, depending on the particular support structure and 3D part geometries and layer slicing.

FIG. 2 illustrates an example embodiment for layer transfusion assembly 16, which includes platen assembly 26 of the present disclosure, and may also include one or more of heated nip roller 28, pre-heaters 30$a$ and 30$b$, post-fuse units 32 (e.g., post-fuse heaters and/or cooling units), and any other suitable component, which may function as disclosed in Hanson et al., U.S. Publication Nos. 2013/0077996 and 2013/0077997, and in Comb et al., U.S. Publication Nos. 2013/0186549 and 2013/0186558.

As discussed further below, platen assembly 26 includes a rigid chuck portion 34 that magnetically retains replaceable and interchangeable build sheets 36. Each build sheet 36 is configured to receive the part and/or support layers from belt 18 for printing 3D parts and support structures (e.g., 3D part 38 and support structure 40) in a layer-by-layer manner.

In the shown embodiment, platen assembly 26 is supported by gantry 42, which is a gantry mechanism configured to move platen assembly 26 along the z-axis and the x-axis to produce a reciprocating rectangular pattern, where the primary motion is back-and-forth along the x-axis (illustrated by broken lines 44). Gantry 42 may be operated by motor 46 based on commands from controller 22, where motor 46 may be an electrical motor, a hydraulic system, a pneumatic system, or the like. In some alternative systems, platen assembly 26 may be mounted to a stationary mount rather than gantry 42.

To ensure that 3D part 38 and support structure 40 are printed with good and accurate precision, the build sheet 36 needs to remain flat and preferably does not move during the printing operation. However, the rolling action of nip roller 28 generates roller pressure, which can cause thin plastic sheets to creep or walk (much like pie dough) during a printing operation. Additionally, and just as importantly, curling forces from the printed layers can cause thin plastic sheets to pull upward in a potato chip-like manner. In fact, in some additive manufacturing systems, the curling forces can be great enough to even pull up steel plates that have cross-sectional areas of about 4-feet and about ¾-inch thicknesses. If these situations occur, the resulting part quality can be compromised. Furthermore, injection molded trays are less desirable for use in system 10 since they are typically flexible between mounting points, which can deflect under the pressure of nip roller 28, causing non-uniformities in the part creation.

Accordingly, chuck portion 34 is uniquely engineered to hold a build sheet 36 in a secure and flat manner that prevents the build sheet 36 from creeping or walking under the rolling action of nip roller 28, and also provides a sufficient restraining pressure to prevent curling forces from the printed layers from pulling build sheet 36 upward from its planar orientation. As discussed below, chuck portion 34 magnetically holds the build sheet 36 in a manner that eliminates any obstructions above the build surface, which could otherwise interfere with nip roller 28 during printing operations.

Figure 3:
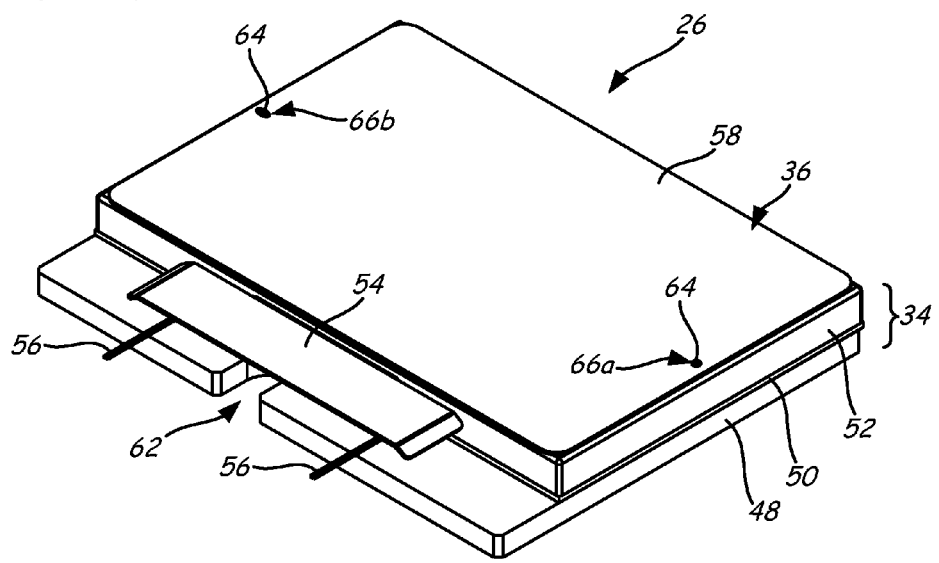
FIG. 3 is a top isometric view of the platen assembly.
Figure 4:
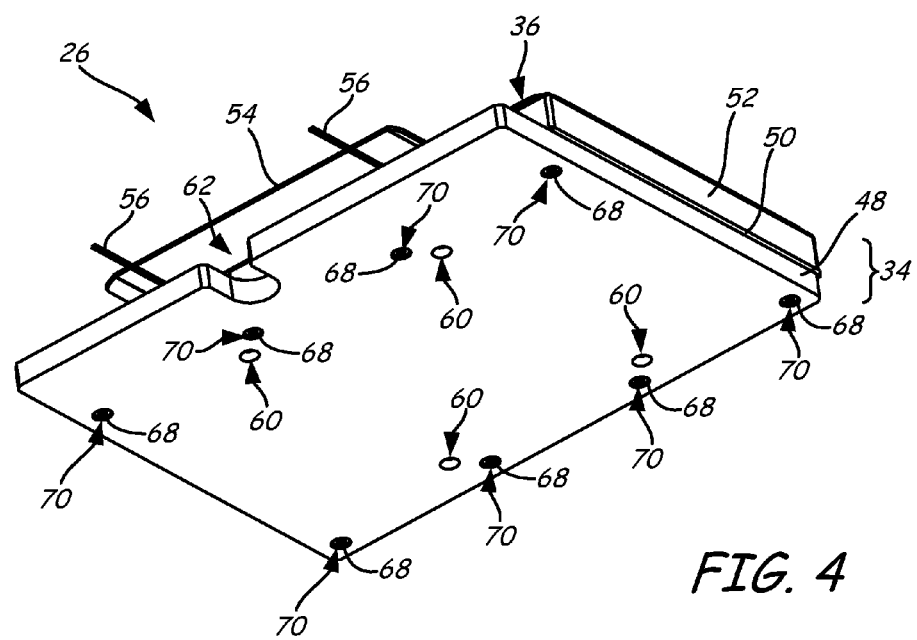
FIG. 4 is a bottom isometric view of the platen assembly.

FIGS. 3-8 illustrate an example embodiment for platen assembly 26. As shown in FIGS. 3 and 4, chuck portion 34 of platen assembly 26 includes gantry adapter 48, insulator 50, platen plate 52, heat shield 54, and a pair of heating elements 56. Additionally, build sheet 36 of platen assembly 26 is an example of a replaceable and interchangeable build sheet for use with chuck portion 34, and includes top receiving surface 58. Receiving surface 58 is the surface that receives the printed layers of 3D part 38 and/or support structure 40.

Gantry adapter 48 is base component that is preferably fabricated from one or more metallic materials (e.g., aluminum or stainless steel), and is configured to securely mount platen assembly 26 to gantry 42 with four mounting bores 60 (shown in FIG. 4) or other suitable types and numbers of mounting mechanisms. Gantry adapter 48 may also include an optional notch 62, which may be used to route cables for layer transfusion assembly 16 in a convenient manner.

Insulator 50 is one or more liners or standoffs disposed between gantry adapter 48 and platen plate 52, which may be derived from one or more thermally-insulating materials. In embodiments in which insulator 50 is a contiguous liner, insulator 50 preferably has similar thermal expansion coefficients to the material(s) of platen plate 52 (e.g., mica). In some preferred embodiments, insulator 50 may be a webbed or meshed liner, or, more preferably, includes standoffs to physically separate platen plate 52 from gantry adapter 48 and gantry 42 with air gaps. This thermally isolates platen plate 52 from gantry adapter 48 and gantry 42, preventing or otherwise restricting heat generated at platen plate 52 from being drawn into gantry adapter 48 and gantry 42.

Platen plate 52 is a heatable platen, preferably fabricated from one or more metallic materials (e.g., aluminum), and is configured to retain build sheet 36 by magnetic coupling, as discussed below. Additionally, platen plate 52 includes a pair of pins or dowels 64, that extend through platen plate 52 and into opposing holes 66a and 66b in build sheet 36, as also discussed below. As discussed further below pins 64 may be replaced with other suitable raised members, such as raised bosses or ribs.

In alternative embodiments, one or more of gantry adapter 48, insulator 50, and platen plate 52 may be integrally fabricated together as a single component. For example, gantry adapter 48 and platen plate 52 may be a single component that where the gantry adapter 48 portion is offset from the platen plate 52 portion by thermally-insulating standoffs. Furthermore, in other embodiments, gantry adapter 48 may be replaced with other connective mechanisms to operably secure platen plate 52 to gantry 42 (or other gantry assembly).

In further alternative embodiments, one or more of liner 50, heat shield 54, and heating elements 56 may be omitted, such that platen plate 52 is not directly heated during a printing operation. For example, these components may be omitted when layer transfusion assembly 16 operates in a heated chamber. Alternatively, these components may be omitted when printing from low-temperature part and support materials (e.g., in room-temperature environment).

As shown in FIG. 4, platen plate 52 is secured to gantry adapter 48 with eight fasteners 68 that extend through eight holes 70 in gantry adapter 48, through eight holes in insulator 50 (referred to as holes 72, shown below in FIG. 7), and into eight holes in platen plate 52 (referred to as holes 74, shown below in FIG. 8). This secures platen plate 52 to gantry adapter 48, with insulator 50 sandwiched therebetween, to prevent platen plate 52 from moving relative to gantry adapter 48. This accordingly allows gantry 42 to move the entirety of platen assembly 26 together in the reciprocating rectangular pattern. While illustrated with eight fasteners and a corresponding number of holes, gantry adapter 48, insulator 50, and platen plate 52 may be secured together using any suitable mechanism.

Heat shield 54 is secured to a lateral edge of platen plate 52, and is configured to prevent heat generated by heating elements 56 from radiating upwards from the lateral side of platen plate 52. Heat shield 54 may be fabricated from any suitable material, such as metallic materials (e.g., aluminum) and/or high-temperature polymeric materials.

Heating elements 56 are a pair of electric heating elements configured to heat and maintain platen plate 52 at an elevated temperature, as discussed in Comb et al., U.S. Publication Nos. 2013/0186549 and 2013/0186558. The particular heating temperature may vary depending on the compositions of the part and support materials. For example, when printing with an ABS part material, heating elements 56 may heat platen plate 52 to about 110° C.

Figure 5:
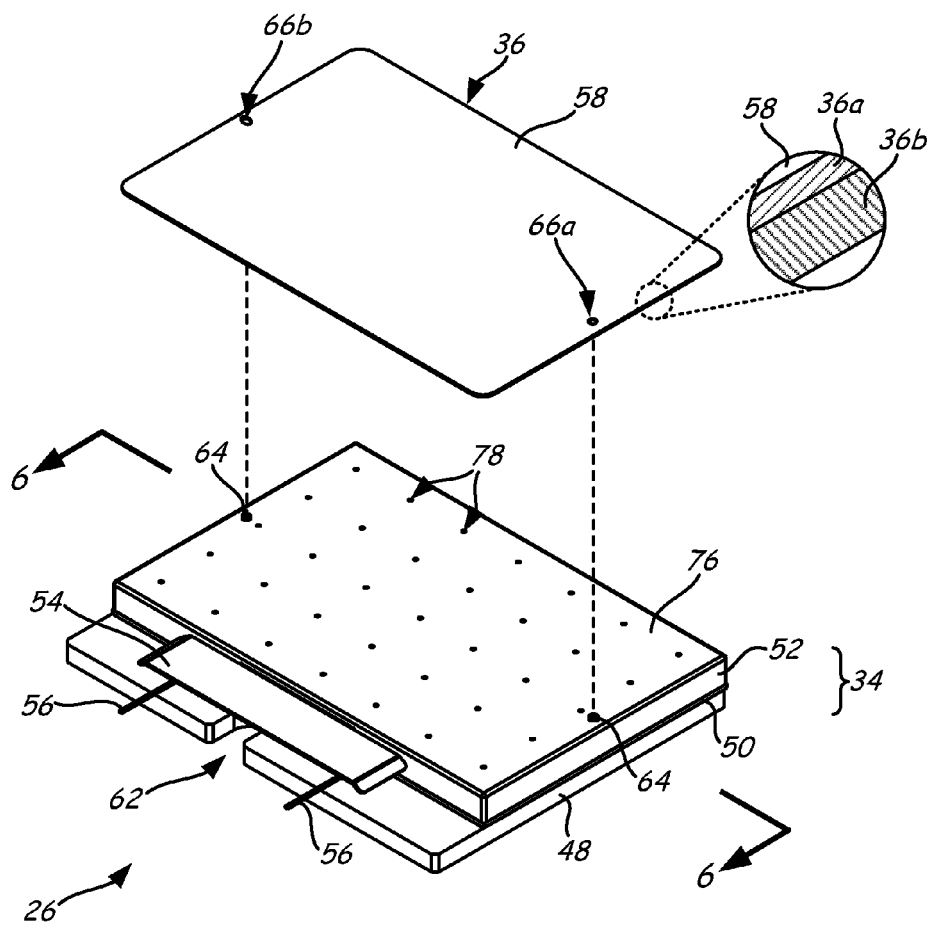
FIG. 5 is a top isometric view of the platen assembly with a build sheet removed from a chuck portion of the platen assembly.

As shown in FIG. 5, build sheet 36 is a removable and interchangeable sheet for receiving the printed part and support layers of 3D part 38 and support structure 40 (or multiple 3D parts and support structures). In a preferred embodiment, build sheet 36 is a multiple-layer sheet having a top film 36a laminated on or otherwise adhered to a metallic base sheet 36b. Base sheet 36b is derived from one or more ferromagnetic materials, such as one or more metallic materials (e.g., steel), to assist in the magnetic coupling to platen plate 52.

Top film 36a may be derived from one or more polymeric coatings, tapes, or other lamina, which may be adhered to base sheet 36b. For example, a polycarbonate top film 36a may be adhered with a high-temperature adhesive to a steel base sheet 36b, which is advantageous for use with ABS and polycarbonate part materials due to their similar glass transition temperatures.

For use with higher-temperature part materials, such as polyetherimide part materials, top film 36a may be applied to base sheet 36b as a high-temperature tape, such as polyimide tapes commercially available under the trademark "KAPTON" from E. I. du Pont de Nemours and Company, Wilmington, Del. Alternatively, for use with lower temperature part materials, such as polylactic acid part materials, tapes derived from polymeric materials having lower glass transition temperatures may be applied to base sheet 36b.

The top film 36a, as an adhesive tape or other coating adhered to base sheet 36b, preferably exhibits good adhesion to the part and/or support materials used in system 10. To this end, top film 36a may optionally be surface treated or otherwise conditioned to increase its adhesive properties (e.g., texturing). As mentioned above, good adhesion is beneficial for anchoring the printed layers, thereby reducing curl and part distortions during the printing process.

Build sheet 36 preferably has an overall thickness that can vary based on a desired stiffness for use in system 10, while also enabling efficient peeling of the printed layers. Suitable thicknesses for base sheet 36b may range from about 5 mils to about 100 mils, and more preferably from about 5 mils to about 50 mils, and even more preferably from about 10 mils to about 30 mils. As discussed below, these thicknesses for build sheet 36b preferably balance the competing factors of (i) providing a sufficient magnetic coupling, and (ii) providing sufficient flexibility to remove 3D part 38 and support structure 40 after a printing operation is completed. Correspondingly, suitable thicknesses for top film 36a may range from about 1 mil to about 30 mils, more preferably from about 5 mils to about 20 mils, and even more preferably from about 5 mils to about 10 mils.

As further shown in FIG. 5, build sheet 36 may be placed onto a top surface of platen plate 52, referred to as top surface 76. In particular, build sheet 36 may be aligned such that pins (or other raised members) 64 insert into holes 66a and 66b when build sheet 36 is flush against top surface 76. Hole 66a preferably provides a close tolerance fit with its associated pin 64 to fix the position of build sheet 36 relative to platen plate 52. Hole 66b, however, is preferably an elongated slot, where the engagement between hole 66b and its associated pin 64 preferably prevents rotation of build sheet 36 around hole 66a, while also allowing build sheet 36 to expand as it is heated by platen plate 52 and heating elements 56.

In some embodiments, platen plate 52 may include additional numbers of pins 64 (i.e., two or more pins 64) and build sheet 36 may include additional numbers of holes corresponding to holes 66a and/or hole 66b (i.e., two or more holes 66a/66b). Pins 64 and holes 66a and 66b are preferably located on the peripheral edges to maximize the printable surface area on receiving surface 58. As mentioned above, pins 64 may be replaced with other suitable members that are raised above top surface 76, which may function in a similar manner to pins 64 (e.g., raised bosses or ribs).

Figure 6:
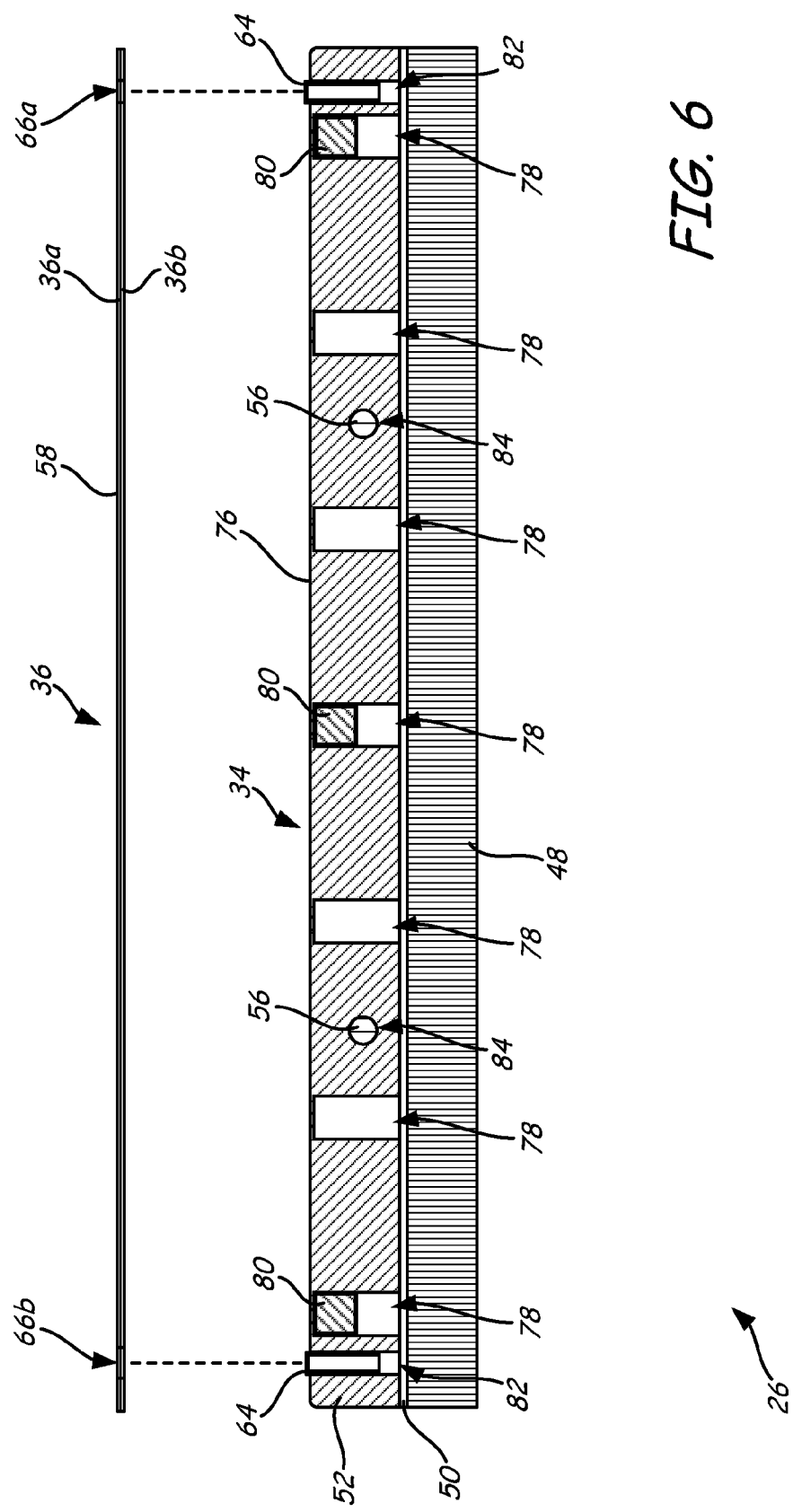
FIG. 6 is a sectional view of Section 6-6 taken in FIG. 5, illustrating magnet placements in the chuck portion.

Top surface 76 is a substantially planar surface that includes surface holes that extend into an array of counterbores 78, as shown in FIG. 6 (also shown below in FIG. 8). As used herein, the term "planar surface" refers to a surface that is flat, but may also include small holes (e.g., for counterbores 78), grooves, and the like. Counterbores 78 provide convenient locations for inserting a plurality of magnets 80, which may be secured in counterbores 78 in any suitable manner (e.g., with an adhesive). In the shown example, platen assembly 26 includes three magnets 80 to magnetically couple build sheet 36 to top surface 76 of platen plate 52. However, in alternative embodiments, platen assembly 26 may include any suitable number of magnets 80 for customizing the magnetic coupling, where each magnet is preferably capable of withstanding the heated temperature of platen plate 52.

Furthermore, the array of counterbores 78 (best shown below in FIG. 8) allows magnets 80 to be positioned in any suitable configuration, where the holes in top surface 76 are optional holes to facilitate the removal of magnets 80, if desired. As such, a user may customize the locations of magnets 80 relative to platen plate 52. A suitable application for customizing the locations of magnets 80 is when using build sheets 36 having different sizes (e.g., larger or smaller build sheets 36).

In an alternative embodiment, platen plate 52 may have a fixed number of counterbores 78 (or other openings) to permanently receive and retain the same number of magnets 80 in a non-customizable manner (e.g., three counterbores 78 and three magnets 80). In further alternative embodiments, counterbores 78 may be replaced with any suitably-shaped slot for receiving and retaining magnets 80. Correspondingly, magnets 80 may have different shapes to be received the reciprocating slots of platen plate 52, such as rectangular shapes, round shapes, bar shapes, and the like.

Figure 7:
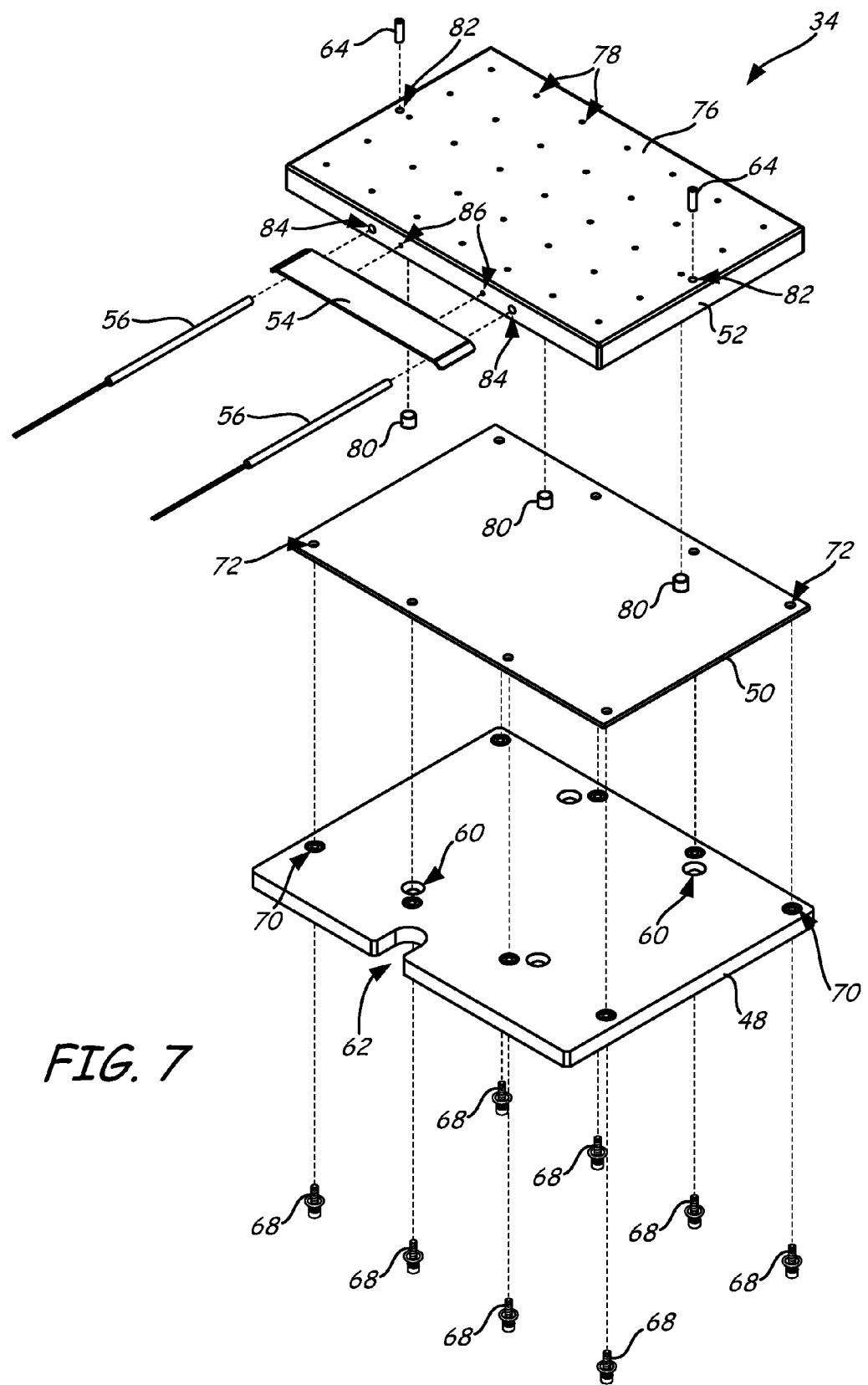
FIG. 7 is a top isometric exploded view of the chuck portion of the platen assembly.
Figure 8:
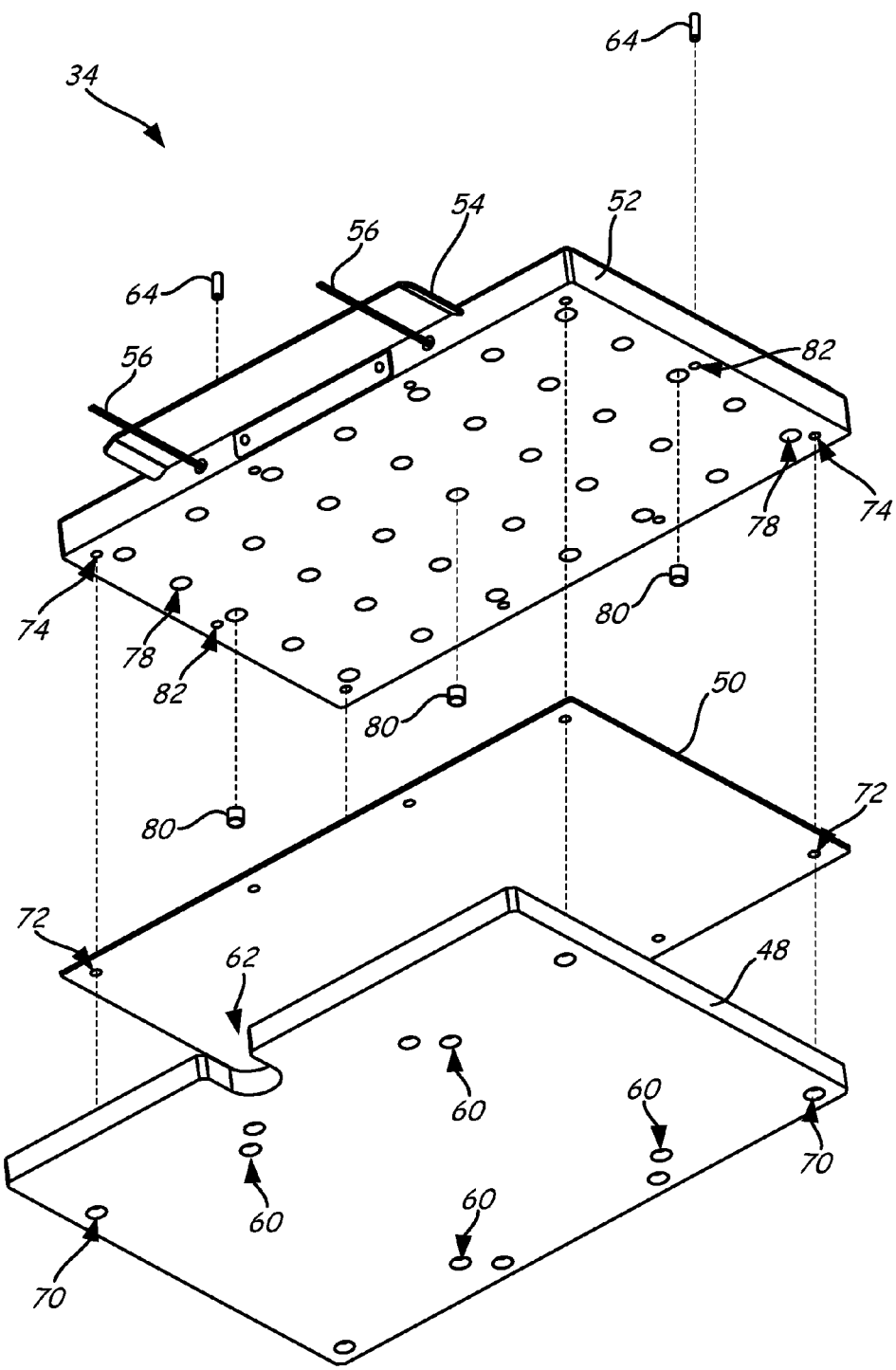
FIG. 8 is a bottom isometric exploded view of the chuck portion of the platen assembly.

In yet another alternative embodiment, counterbores 78 (or other suitable slots) may extend through top surface 76 such that magnets 80 may be inserted through top surface 76 (rather than through the bottom surface, as shown in FIGS. 6-8). In this case, the top faces of the inserted magnets 80 may be flush with top surface 76 to maintain a substantially level surface for magnetically coupling build sheets 36.

In a first embodiment, magnets 80 are permanent magnets that generate persistent magnetic fields at top surface 76. These magnetic fields provide the magnetic coupling required to hold build sheet 36 flush against top surface 76. In this case, build sheet 36 may be removed from top surface 76 (e.g., after a printing operation is completed) by peeling or otherwise pulling build sheet 36 with a pulling force that is greater than the attraction force of the generated magnetic fields.

In another embodiment, magnets 80 are electromagnets configured to receive electrical currents from system 10 to generate the magnetic fields. In this embodiment, each magnet 80 may be a coil electrically connected to system 10 via one or more electrical lines (not shown). The coil may optionally be wrapped around a ferromagnetic material (e.g., steel) to increase the magnetic coupling strength. This embodiment is beneficial for generating a strong magnetic coupling during a printing operation (by inducing an electrical current through the coils of magnets 80), while also allowing the magnetic field to be disabled or otherwise reduced after the printing operation (by stopping the electrical current) to readily remove build sheet 36.

Additionally, magnets 80 as electromagnets may optionally be used to generate heat for platen plate 52 and build sheet 36 via electrical resistance heating. For example, the voltage and resistance may be sized to produce the desired levels of power. In this use, heating elements 56 may be optionally omitted, or may be used in addition to the electrical resistance heating.

In either embodiment, the attraction strength of the magnetic coupling during a printing operation is preferably great enough to prevent build sheet 36 from moving laterally relative to top surface 76, and to prevent build sheet 36 from pulling upward from its planar orientation against top surface 76 (e.g., due to curling forces). However, there is a limit to the attraction strength that can be generated per unit volume of base sheet 36b. In effect, assuming an excess number of magnets 80, the strength of the magnetic coupling is typically limited by the cross-sectional area and thickness of base sheet 36b.

Accordingly, the attraction strength can be increased to a given extent by increasing the number of magnets 80 below the cross-sectional area of base sheet 36b. However, when this is maxed out, the thickness of base sheet 36b becomes the limiting factor, where a greater thickness for base sheet 36b may provide a stronger magnetic coupling. However, a greater thickness for base sheet 36b may also detrimentally affect its flexibility, which can potentially reduce the ability to peel 3D part 38 and support structure 40. Thus, the thickness of base sheet 36b, such as the suitable and preferred thicknesses discussed above, is preferably selected to balance these competing factors.

In general, printing operations that generate lower curling forces may utilize thinner build sheets 36 and/or more sparse magnetic fields. In comparison, printing operations that generate higher curling forces preferably increase the densities of the magnetic fields (e.g., more magnets), and, if necessary, also increase the thickness of build sheet 36, where the strength of the magnetic coupling typically follows a non-linear relationship with the thickness of build sheet 36.

As further shown in FIG. 6, platen plate 52 also includes a pair of opposing bores 82, which are the locations in which pins 64 are inserted and retained such that the top ends of pins 64 extend upward beyond the plane of top surface 76. This allows pins 64 to insert into holes 66a and 66b of build sheet 36. In alternative embodiments, pins 64 may be integrally formed with platen plate 52 such that pins 64 extend above top surface 76 in the same manner. Preferably, the top ends of pins 64 do not extend above receiving surface 58 of build sheet 36 when build sheet 36 rests on top surface 76 of platen plate 52. This provides a planar, unobstructed receiving surface 58 for nip roller 28 to roll across.

Similarly, the other components of platen assembly 26, including heat shield 54, preferably remain lower than the height of receiving surface 58 of build sheet 36. Accordingly, all of the holding mechanisms for retaining build sheet 36 to platen plate 52 (i.e., magnets 80 and pins 64) remain below the height of receiving surface 58. This prevents any interference with the motion of nip roller 28 of system 10, or with any extrusion tips or jetting nozzles in extrusion-based and jetting-based additive manufacturing systems.

As also shown in FIG. 6, heating elements 56 extend through lateral openings 84 in platen plate 52, preferably in a tight-fit manner, to allow heating elements 56 to conductively heat platen plate 52. The relative engagements between the components of platen assembly 26 are further shown in FIGS. 7 and 8. For example, as shown in FIG. 7, heat shield 54 may be mounted to the lateral side of platen plate 52 with lateral holes 86.

Platen assembly 26 may be assembled by inserting heating elements 56 through lateral openings 84 of platen plate 52, securing magnets 80 in counterbores 78, and inserting pins 64 into holes 82. Insulator 50 may positioned between gantry adapter 48 and platen plate 52, and the stack may be secured together with fasteners 68. Heat shield 54 may also be connected to platen plate 52 with lateral holes 86, and the resulting platen assembly 26 may be mounted to gantry 42 via mounting bores 60. Heating elements 56 may then be connected to electrical lines of system 10 to receive electrical power during operation.

Once installed in system 10, a build sheet 36 may be placed on top surface 76 of platen plate 52 such that pins 64 insert into holes 66a and 66b of build sheet 36. When build sheet 36 is placed on top surface 76, magnets 80 securely hold build sheet 36 down against top surface 76, where pins 64 and holes 66a and 66b prevent movement of build sheet 36 in the plane of top surface 76. Electrical power may also be relayed to heating elements 56 to heat platen plate 52 and build sheet 36 to a desired temperature, as discussed above.

During a printing operation, belt 18 may carry each printed layer past pre-heater 30a, which may heat the printed layer and the associated region of belt 18 to a desired transfer temperature. Additionally, gantry 42 may move platen assembly 26 in a reciprocating rectangular pattern 44. In particular, gantry 26 may move platen assembly 26 along the x-axis below, along, or through pre-heater 30b. Pre-heater 30b heats the top surfaces of 3D part 38 and support structure 40 to an elevated temperature, such as a desired transfer temperatures of the part and support materials. As discussed in Comb et al., U.S. Publication Nos. 2013/0186549 and 2013/0186558, heaters 30a and 30b may heat the printed layers and the top surfaces of 3D part 38 and support structure 40 to about the same temperatures to provide a consistent transfusion interface temperature.

The continued rotation of belt 18 and the movement of platen assembly 26 align the heated layer on belt 18 with the heated top surfaces of 3D part 38 and support structure 40 with proper registration along the x-axis. Gantry 42 may continue to move platen assembly 26 along the x-axis, at a rate that is synchronized with the rotational rate of belt 18 in the direction of arrow 20 (i.e., the same directions and speed). This causes belt 18 to rotate around nip roller 28 to nip belt 18 and the heated layer on belt 18 against the top surfaces of 3D part 38 and support structure 40. This presses the heated layer between the heated top surfaces of 3D part 38 and support structure 40 at the location of nip roller 28, which at least partially transfuses heated layer to the top layers of 3D part 38 and support structure 40.

As the transfused layer passes the nip of nip roller 28, belt 18 wraps around nip roller 28 to separate and disengage from platen assembly 26. This assists in releasing the transfused layer from belt 18, allowing the transfused layer to remain adhered to 3D part 38 and support structure 40. As can be appreciated, the relative movement between platen assembly 26 and nip roller 28 can cause substantial lateral pressures to be applied to build sheet 36, particularly when printing the first several layers of 3D part 38 and support structure 40.

However, the magnetic coupling, along with the insertion of pins 64 into holes 66a and 66b, allow build sheet 36 to withstand these lateral pressures without moving relative to platen plate 52, and to remain flush against top surface 76 of platen plate 52. This is also attainable without requiring the use of a vacuum system. As such, system 10 may be free of any vacuum system for securing build sheet 36 to platen plate 52.

After the transfused layer is released from belt 18, gantry 42 may continue to move platen assembly 26 along the x-axis to one or more post-fuse units 32 (e.g., post-fuse heaters and/or cooling units), as also discussed in Comb et al., U.S. Publication Nos. 2013/0186549 and 2013/0186558. Gantry 42 may then actuate platen assembly 26 downward, and move platen assembly 26 back along the x-axis to a starting position along the x-axis, following the reciprocating rectangular pattern 44.

Platen assembly 26 desirably reaches the starting position for proper registration with the next printed layer. In some embodiments, gantry 42 may also actuate platen assembly 26 and 3D part 38/support structure 40 upward for proper registration with the next printed layer. The same process may then be repeated for each remaining printed layer of 3D part 38 and support structure 40.

After the printing operation is completed, build sheet 36, with the resulting 3D part 38 and support structure 40, may be removed from platen plate 52. In embodiments in which magnets 80 are permanent magnets, this may be achieved by peeling or otherwise pulling build sheet 36 apart from platen plate 52 with enough upward force to overcome the magnetic coupling of magnets 80. Alternatively, in embodiments in which magnets 80 are electromagnets, the electrical current relayed to magnets 80 may be stopped, thereby disabling or otherwise reducing the magnetic coupling. In this case, build sheet 36 may then be readily removed from top surface 76 with little effort.

After removal from platen plate 52, the thin, flexible nature of build sheet 36 allows 3D part 38 and support structure 40 to be removed by flexing build sheet 36. This flexing of build sheet 36 amplifies the stresses induced at the bending line of action, causing delamination of 3D part 38 and support structure 40 from its base part, or delamination of the base part from build sheet 36.

The removed 3D part 38 and support structure 40 may then undergo one or more post-printing operations. For example, support structure 40 derived from a soluble support material may be sacrificially removed from 3D part 38, such as by using an aqueous-based solution (e.g., an aqueous alkali solution). Under this preferred soluble technique, support structure 40 may at least partially dissolve in the solution, separating it from 3D part 38 in a hands-free manner.

For a subsequent printing operation, the same or a new build sheet 36 may be placed on top surface 76 of platen plate 52. For instance, the previous build sheet 36 may be recycled or otherwise discarded in an environmentally-friendly manner, and a new build sheet 36 may be placed on, and magnetically coupled to, top surface 76 in the same manner as discussed above for use in the subsequent printing operation.

Alternatively, if the previous 3D part 38 and support structure 40 cleanly are removed from the previous build sheet 36, and the previous build sheet 36 retains its integrity, the same previous build sheet 36 may be reused. In some cases, the same previous build sheet 36 may also be reused by removing any residual printed layers from top film 36a to provide a clean receiving surface 58. In a further alternative scenario, the previous top film 36a may be removed from base sheet 36b, and a new top film 36a may be applied to base sheet 36b (e.g., as a new adhesive tape or coating). This allows the previous base sheet 36b to be reused, if desired.

The replaceable nature of build sheet 36 also allows different build sheets 36 to be used with the same platen plate 52, where the different build sheets 36 may have top films 36a derived from different materials, different thicknesses, and/or different receiving surfaces 58. For example, the top films 36a of different build sheets 36 may include polymeric materials that are compositionally different (e.g., polycarbonates versus polyimides).

In most embodiments, the different build sheets 36 preferably have the same base sheets 36b to ensure the same magnetically coupling is achieved with platen plate 52. For example, the base sheets 36b of different build sheets 36 may compositionally be the same or substantially the same (i.e., the same or substantially the same metallic materials). However, in some cases, the base sheets 36b may also be different, such as having different thicknesses (for customized flexing) and/or different metallic compositions to maintain good adhesion with different top films 36a, so long as they maintain good magnetic couplings to platen plate 52.

Accordingly, build sheets 36 may be individually customized for use with particular part and support materials to improve adhesion and/or peeling characteristics. For example, a first build sheet 36 may have a polycarbonate-coating top film 36a for use with ABS and polycarbonate part materials, and a second build sheet 36 may have a polyimide-tape top film 36a for use with polyetherimide part materials. This customization provides in a unique advantage over generic build substrates that are universally used with multiple part and support materials, namely it provides a low-cost solution to individually tailor the adhesion and/or peeling characteristics to particular part and/or support materials.

The above-discussed steps for replaceably and interchangeably using one or more build sheets 36 with platen plate 52 may be performed in a manual or automated manner. In a manual process, a user may align and place each build sheet 36 onto top surface 76 of platen plate 52 prior to a printing operation. After the printing operation is completed, the user may the peel or otherwise pull the build sheet 36 with the printed 3D part 38 and support structure 40 apart from platen plate 52, and replace the given build sheet 36 (or reuse the same build sheet 36).

Alternatively, in an automated process, system 10 may include an automated mechanism to place each build sheet 36 onto top surface 76 of platen plate 52 prior to each printing operation, and to remove and replace the given build sheets 36 after each printing operation. Examples of suitable automated mechanisms for operating system 10 in this manner are disclosed in Swanson et al., U.S. patent application Ser. No. 13/791,005. For instance, system 10 may include a stack of multiple build sheets 36, which may be individually placed onto platen plate 52 between each printing operation. This automated arrangement allows system 10 to perform multiple, successive printing operations in an automated manner with minimal or no user intervention, such as in a printing farm environment of multiple additive manufacturing systems.

Although the present disclosure has been described with reference to preferred embodiments, workers skilled in the art will recognize that changes may be made in form and detail without departing from the spirit and scope of the disclosure.

The invention claimed is:

1. An electrophotography-based additive manufacturing system for printing a three-dimensional part, the additive manufacturing system comprising:
    a printing mechanism configured to print imaged layers of charged powder material to a moving belt; and a platen assembly comprising:
    a platen plate having a top surface having a plurality of spaced apart members extending therefrom; and
    one or more magnets secured to the platen plate and configured to generate one or more magnetic fields at the top surface of the platen plate; wherein the platen assembly is configured to magnetically couple a build sheet to the top surface of the platen plate due to the one or more generated magnetic fields and the plurality of spaced apart members are configured to be accepted by a plurality of apertures in the build sheet, and wherein the build sheet is configured to receive the printed layers from the printing mechanism wherein the platen assembly moves in a synchronized rate of speed with the imaged layer to transfer the imaged layer from the moving belt to the platen or previously printed part layers over time using heat and pressure.

2. The additive manufacturing system of claim 1, and further comprising the build sheet, which comprises:
    a base sheet comprising one or more ferromagnetic materials; and
    a top film disposed on the base sheet and comprising one or more polymeric materials, wherein the top film defines a receiving surface for the build sheet to receive the printed layers and wherein the plurality of apertures extend through the base sheet and the top sheet.

3. The additive manufacturing system of claim 2, wherein the top film comprises an adhesive tape.

4. The platen assembly of claim 1, wherein the printing mechanism comprises one or more electrophotography engines and a transfer medium.

5. The additive manufacturing system of claim 1, and further comprising at least one heating element configured to heat the platen plate and the magnetically coupled build sheet.

6. The additive manufacturing system of claim 1, and further comprising a gantry mechanism operably secured to the platen plate.

7. The additive manufacturing system of claim 1, wherein the one or more magnets are permanent magnets.

8. The additive manufacturing system of claim 1, wherein the one or more magnets are electromagnets configured to receive electrical currents from the additive manufacturing system to generate and to disable the one or more magnetic fields.

9. A method for using a platen assembly in an electrophotography-based additive manufacturing system, the method comprising:
    placing a first build sheet onto a top surface of a platen plate that is operably mounted to a gantry mechanism of the additive manufacturing system by positioning a plurality of holes in the first build sheet about a plurality of members extending from the platen plate; magnetically coupling the placed first build sheet to the top surface of the platen plate;

printing imaged layers of a three dimensional part of charged powder material to a moving belt;

transferring the imaged layers of a three-dimensional part onto the magnetically-coupled first build sheet wherein the platen plate and build sheet moves in a synchronized rate of speed with the layer on the moving belt while heating and pressing the printed layers to previously printed layers over time: removing the first build sheet with the printed three-dimensional part from the top surface of the platen plate;

flexing the first build sheet to delaminate the three-dimensional part from the first build sheet; and placing a second build sheet onto the top surface of the platen plate;

magnetically coupling the placed second build sheet to the top surface of the platen plate; and printing layers of a second three-dimensional part onto the magnetically-coupled second build sheet.

10. The method of claim 9, wherein the first build sheet comprises a ferromagnetic base sheet and a top film disposed on the ferromagnetic base sheet, and wherein printing layers of the three-dimensional part onto the magnetically-coupled first build sheet comprises printing layers of the three-dimensional part onto the top film of the first build sheet.

11. The method of claim 9, wherein printing the layers of the three-dimensional part and printing the layers of the second three-dimensional part are each performed with an electrophotography-based additive manufacturing technique.

12. The method of claim 9, wherein printing layers of the three-dimensional part onto the magnetically-coupled first build sheet comprises rolling a nip roller across the magnetically-coupled first build sheet.

13. The method of claim 9, and further comprising heating the platen plate and the build sheet.

14. The method of claim 13, and further comprising thermally insulating the platen plate from the gantry mechanism.

* * * * *